United States Patent Office 3,219,114
Patented Nov. 23, 1965

3,219,114
SECONDARY RECOVERY OF OIL FROM SUBTERRANEAN OIL-BEARING STRATA
William F. Oxford, Jr., Beaumont, Tex., assignor to Sun Oil Company, Philadelphia, Pa., a corporation of New Jersey
No Drawing. Filed Jan. 13, 1965, Ser. No. 425,333
5 Claims. (Cl. 166—42)

This application is a continuation-in-part of copending application Serial No. 84,518, filed January 24, 1961, now abandoned.

This invention relates to secondary recovery of oil from underground petroleum formations and more particularly concerns a method for recovering so-called "cellar" oil from formations having a downstructure.

Inclined petroleum reservoirs which have little or no water drive often are found associated with salt domes and faulted structures. Such reservoirs generally are relatively small, so that frequently no more than one or a few wells drilled into the reservoir can be economically justified. After primary depletion has occurred, the level of oil in the reservoir will have dropped to such extent that the well or wells no longer will produce oil. The oil remaining in the reservoir at this time has been termed "cellar" oil (The Oil and Gas Journal, vol. 57, No. 17, April 20, 1959, pages 62-64).

Attempts have been made heretofore to recover cellar oil by pumping a large amount of fresh or salt water into the deepest well and then shutting in the well for a time to allow the water to seep downwardly and displace the oil until its level has risen sufficiently to permit production to be resumed. While this procedure has been partially successful, it has not proved to be as effective as desired due to poor displacement of the oil from the lower part of the reservoir by the injected water. Generally a considerable portion of the oil remains in place in the reservoir sands and cannot be recovered. Also a long shut-in period is required for the injected water to seep downwardly through the body of cellar oil, during which time no production is achieved.

The present invention provides an improved manner of recovering cellar oil from a petroleum reservoir having a downstructure. According to the invention water containing a certain surfactant material, as hereinafter described, is pumped through the tubing of a well into the reservoir in amount sufficient to raise the oil level at least above the bottom of the lowest well penetrating the formation. The injection well is then closed in for a time to permit the water to migrate downwardly and displace the oil until the oil level is above the bottom of the well. Production of oil from the formation is then resumed. Generally the oil will be produced through the same well as was used to inject the water but other wells penetrating the formation can be used if available.

It has now been found that the presence of the hereinafter described surfactant not only expedites the displacement of the oil by the water thus substantially reducing the time that the well needs to be shut-in, but also materially increases the total amount of cellar oil that can be displaced from the lower to the upper part of the reservoir. Hence the amount of oil that can be recovered is substantially increased.

The surfactants used in practicing the invention are benzyl chloride quaternary compounds of coco amido amine having the generic formula:

$$\left[ R^1-\overset{O}{\overset{\|}{C}}-\overset{H}{\overset{|}{N}}-(CH_2)_n-N\overset{R^2}{\underset{(R^3)_2}{\diagdown}} \right]^+ Cl^-$$

wherein $R^1$ represents the alkyl groups present in the fatty acids of coconut oil, $R^2$ is benzyl, methyl benzyl or dimethyl benzyl, $R^3$ is methyl, ethyl or propyl and $n$ is either 2 or 3. These surfactants can be prepared in several ways involving known chemical procedures. One manner of preparation comprises saponifying coconut oil, acidifying the saponification product to obtain the free fatty acids, reacting the acids with ammonia to produce fatty acid amides, reacting the amides with β-bromoethyl dimethyl amine to replace the bromine atom with a

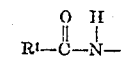

group, and reacting the resulting product with benzyl chloride to form the quaternary compound. It is generally desirable to dissolve the product in a suitable solvent such as an aqueous alcohol, to facilitate its use in practicing the invention.

The above-specified surfactant is added to the injection water in amount averaging at least 2 p.p.m. and is beneficial in such relatively low concentrations and even more so in higher concentration such as 20-500 p.p.m. The presence of the surfactant in such concentrations considerably improves the effectiveness of the injection fluid for displacing the cellar oil. Preferably salt water having a specific gravity in excess of 1.05 is used as the displacing fluid to increase the difference in gravity between the fluid and the oil and thus facilitate the displacement.

In a preferred embodiment of the invention a second surfactant, described below, is employed in addition to the above-specified surfactant. This second surfactant alone has been found to be ineffective in improving the displacing action of the injection water. However, when used in combination with the surfactant described above, it has an unexpected synergistic effect and still further increases the displacing ability of the injection water. The amount of the second surfactant used also should be at least 2 p.p.m. and can be even more beneficial in higher concentrations such as 20-500 p.p.m.

The second surfactant is prepared by reacting ethylene oxide with a primary amine having the formula $R^4NH_2$ wherein $R^4$ is a tertiary alkyl group of 18-24 carbon atoms. The molar proportion of the ethylene oxide to the amine should be in the range of 6:1 to 14:1 and preferably about 10:1. The reaction can be carried out in the manner described in Riley U.S. Patent No. 2,871,266. The reaction is believed mainly to add $-CH_2O-$ groups between the nitrogen atom and one of the hydrogen atoms of the amine group but it also may to some extent add $-CH_2O-$ groups between the nitrogen and the other hydrogen atom to form products having two polyethylene oxide chains per molecule. The surfactant formed by this reaction also can be diluted with a suitable solvent, such as an aqueous alcohol, to facilitate its use in the field.

The effectiveness of the first-mentioned surfactant used alone and the improved effectiveness of using the two surfactants together can be demonstrated by tests conducted in the following manner. Identical glass tubes are partially filled with Ottawa sand and a quantity of oil field brine is poured into each tube and allowed to drain through the sand. A known volume of kerosene is then introduced into each tube and is permitted to filter through the sand column. The amount of kerosene which passes through the sand is measured and the amount of kerosene retained in the column is calculated. The bottom of each column is then closed and a quantity of oil field brine sufficient to fill the interstices of the sand is introduced at the top of the column. The rate of accumulation of kerosene above the body of sand, resulting from displacement by the brine, is measured and the total amount of kerosene that is finally displaced is ascertained. Comparative runs are made with and without the surfactant materials in the displacing brine.

The volume percent of kerosene displaced in relation to time is shown in the accompanying tabulation for four runs made in the above-described manner. The brine used was an oil field brine having a specific gravity of 1.084. The first surfactant was added to the brine in the form of a solution composed by weight of 65.5% of the benzyl chloride quaternary of coco amido amine, 16.5% isopropanol and 18% water, and the concentration of the surfactant itself in the brine was 131 p.p.m. The second surfactant was added as a solution composed by weight of 30% of the ethylene oxide-tertiary amine reaction product, 15% isopropanol and 55% water, and the concentration of the surfactant itself in the brine was 60 p.p.m. In the run where both surfactants were employed, the respective concentrations were 131 and 60 p.p.m.

| Time, minutes | Brine Alone, percent | With First Surfactant, percent | With Second Surfactant, percent | With Both Surfactants, percent |
|---|---|---|---|---|
| 5 | 16.0 | 31.8 | 15.8 | 23.4 |
| 10 | 31.0 | 50.0 | 24.2 | 42.6 |
| 15 | 43.0 | 63.6 | 34.7 | 72.4 |
| 30 | 64.0 | 75.5 | 65.3 | 87.2 |

From the tabulated data it can be seen that the presence of the first surfactant alone in the brine substantially increased the rate of displacement and the total recovery of kerosene from the sand. On the other hand, the second surfactant alone did not provide any improvement in recovery. However, when it was used in combination with the first surfactant, a synergistic effect was obtained and the highest total recovery of kerosene from the sand in all the runs was obtained.

The foregoing results illustrate the effectiveness of using the first-described surfactant alone or both surfactants together in the recovery of cellar oil from a petroleum reservoir having a downdip structure. By way of contrast, when another commercially available surface active agent, which was an ethylene oxide-rosin amine reaction product, was used in about the same concentration as the first surfactant above and the test was run in the same manner, the following results were obtained:

Time, minutes: With rosin amine product, percent
5 _____ 10.9
10 _____ 18.4
15 _____ 25.8
30 _____ 46.3
60 _____ 48.3

These results show that use of the rosin amine product not only failed to be beneficial but actually reduced the recovery of kerosene from the sand as compared to the use of salt water alone. Only about 75% as much kerosene was displaced from the sand in one hour as when brine alone was used.

The following description illustrates a commercial field application of the invention employing a combination of the two types of surfactants herein specified in substantially lower concentrations then were used in the foregoing laboratory tests:

A downdip oil sand located in a fault block and having no water drive had been produced from two wells until the oil level had dropped to the bottom of the deeper well. Primary recovery from the oil sand then could no longer be effected. The invention was then utilized by pumping, through the deeper well into the formation, salt water containing small concentrations of the benzyl chloride quaternary of coco amido amine and the ethylene oxide-tertiary amine reaction product herein specified. The rate of salt water injection varied from about 400 to about 1500 bbls./day and the rates of addition of the two reactants varied from time to time. Injection of the salt water containing the surfactants into the formation was continued for about six months, during which time a total of about 152,000 bbls. of salt water was introduced. The average concentrations of the quaternary compound and the amine reaction product in the salt water during this time were about 3 p.p.m. and 7 p.p.m., respectively. During the salt water injection period the bottom hole pressure of the deeper well increased from an initial value of 160 p.s.i.g. to 337 p.s.i.g.

Following the salt water injection period the well was shut-in for an extended time to allow the cellar oil to rise in the formation. During the shut-in period the bottom hole pressure dropped to 310 p.s.i.g. From time to time production tests were made on the well to determine when gravity segregation of the oil and salt water would permit commercial oil production. After being shut-in for nine months, the well fluids obtained through the well tubing began showing oil, and then for a period of about twelve months a small production of about 20-24 bbls./month of oil was obtained from periodic 24-hour well tests but the produced well fluid still contained about 99% salt water by volume. After this time oil was obtained from both wells penetrating the formation, and the oil production rate through the well tubing progressively rose while the salt water content of the produced fluid decreased. At a time of 25 months from the initial shut-in of the deeper well, oil production from the two wells has increased to 500 bbls./month and the salt water content had dropped to 90% of the well fluid. At this time the bottom hole pressure for the lower well had dropped to 292 p.s.i.g. Production from both wells was then continued for several months and production data from 24-hour flow tests during the 31st and 33rd month were as shown in Table I.

TABLE I

| Time from initial shut-in, months | 31 | 33 |
|---|---|---|
| Upper well: | | |
| Oil production, bbls./24 hrs | 23 | 15 |
| Salt water production, bbls./24 hrs | 186 | 199 |
| Percent salt water in fluid | 89 | 93 |
| Lower well: | | |
| Oil production, bbls./24 hrs | 40 | 48 |
| Salt water production, bbls./24 hrs | 60 | 102 |
| Percent salt water in fluid | 60 | 68 |
| Bottom hole pressure, p.s.i.g | 287 | 285 |
| Both wells: | | |
| Oil production, bbls./24 hrs | 63 | 63 |

From the foregoing it can be seen that maximum oil production was not reached until about 2½ years from the termination of injecting salt water containing the surfactants into the formation. After 31 months from the end of salt water injection the rate of oil production from the shallower well began to drop off but the oil rate from the other well compensated for this by continuing to increase for a time. At the end of about 33 months the upper well was shut-in while production was continued from the lower well, the purpose being to utilize the reservoir energy more efficiently and obtain maximum oil production. Note that this energy was supplied by virtue of the salt water previously injected into the formation. After the shallower well had been shut-in for about 6 months, production therefrom was again resumed and was continued for about 6 additional months. Production data for 24-hour flow tests at each well during the 40th and 45th months are shown in Table II.

TABLE II

| Time from initial shut-in, months | 40 | 45 |
|---|---|---|
| Upper Well: | | |
| Oil production, bbls./24 hrs | 25 | 15 |
| Salt water production, bbls./24 hrs | 51 | 79 |
| Percent salt water in fluid | 67 | 84 |
| Lower Well: | | |
| Oil production, bbls./24 hrs | 48 | 34 |
| Salt water production, bbls./24 hrs | 78 | 69 |
| Percent salt water in fluid | 62 | 67 |
| Both Wells: | | |
| Oil production, bbls./24 hrs | 73 | 49 |

The data in Table II show that the 6-month shut-in period for the upper well was beneficial, since a reasonably good flow of oil again could be obtained without an inordinate percentage of accompanying salt water. However, in the month following the 45 month time, oil production from the upper well dropped off sufficiently that it became advisable again to shut-in this well. Production was continued from the lower well.

The daily oil production rate from the lower well 49 months after the salt water injection had dropped to 24 bbls. and the salt water production rate had become 76 bbls. The total cumulative oil produced by practice of the invention up to this time had reached 26,160 bbls. The maximum oil and salt water production rates during the entire period were 73 and 360 bbls./day, respectively.

From the foregoing it can be seen that the invention is highly beneficial in permitting the secondary production of cellar oil from a formation not having a natural water drive while avoiding the expense of drilling one or more wells into the lower part of the formation. After carrying out the invention as above described and producing cellar oil until an uneconomically low rate is reached as a result of progressive reduction of the formation pressure, use of the invention with the same formation can be repeated by injecting a further amount of salt water containing one or both types of surfactants as herein specified and thereafter producing fluids from the formation. Use can be made of the invention repeatedly until the formation eventually becomes substantially depleted of recoverable oil.

I claim:

1. In the recovery of oil from an underground formation having a downstructure wherein the level of oil is beneath the bottom of a well penetrating the formation, the method which comprises introducing water containing the hereinafter specified surfactant in amount of at least 2 p.p.m. into the well, the amount of water so introduced being sufficient to raise the oil level above the bottom of the well, closing in the well for a time sufficient to permit the water to migrate downwardly beneath the oil and raise its level, and then producing oil from the formation, said surfactant having the formula:

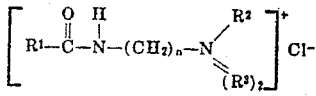

wherein $R^1$ represents the alkyl groups present in the fatty acids of coconut oil, $R^2$ is selected from the group consisting of benzyl, methyl benzyl and dimethyl benzyl, $R^3$ is selected from the group consisting of methyl, ethyl and propyl and $n$ is a whole number of 2–3.

2. Method according to claim 1 wherein the amount of said surfactant is 20–500 p.p.m.

3. Method according to claim 2 wherein the water also contains 20–500 p.p.m. of a second surfactant prepared by reacting ethylene oxide with a primary amine having the formula $R^4NH_2$ wherein $R^4$ is a tertiary alkyl group of 18–24 carbon atoms, the molar proportion of ethylene oxide to said amine being in the range of 6:1 to 14:1.

4. Method according to claim 3 wherein said molar proportion is about 10:1.

5. Method according to claim 1 wherein the water also contains at least 2 p.p.m. of a second surfactant prepared by reacting ethylene oxide with a primary amine having the formula $R^4NH_2$ wherein $R^4$ is a tertiary alkyl group of 18–24 carbon atoms, the molar proportion of ethylene oxide to said amine being in the range of 6:1 to 14:1.

References Cited by the Examiner

UNITED STATES PATENTS

| | | | |
|---|---|---|---|
| 2,792,894 | 5/1957 | Graham et al. | 166—9 X |
| 3,047,062 | 7/1962 | Meadors | 166—9 |
| 3,083,764 | 4/1963 | Gaskell et al. | 166—42 X |
| 3,104,702 | 9/1963 | Gaskell et al. | 166—9 |

OTHER REFERENCES

Schwartz et al., Surface Active Agents, 1949, Interscience Publishers Inc., New York, page 172.

CHARLES E. O'CONNELL, *Primary Examiner.*